Figure 1:
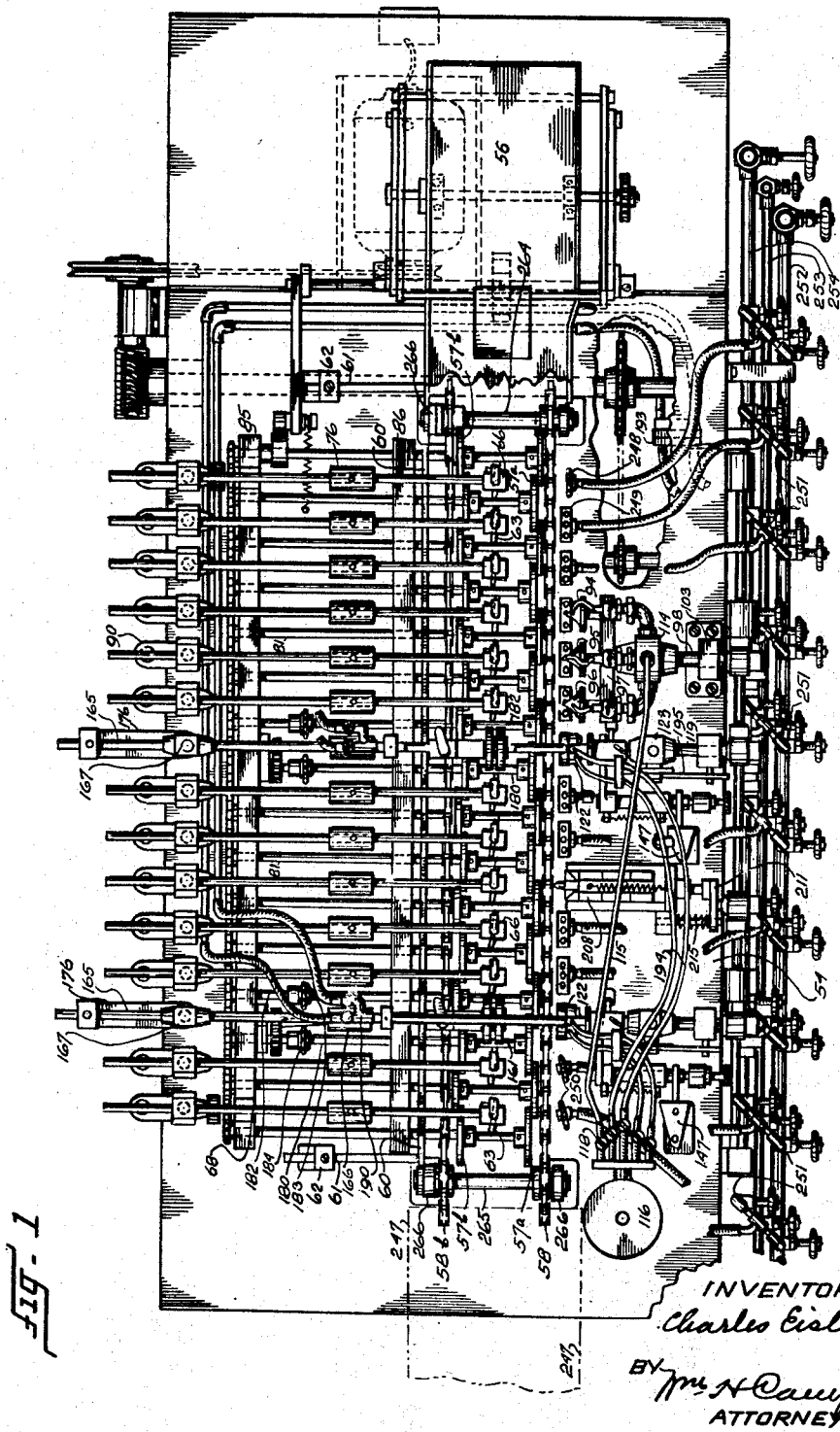

July 27, 1948.  C. EISLER  2,446,000

MACHINE FOR FLANGING GLASS BLANKS

Filed Nov. 17, 1943  11 Sheets-Sheet 1

INVENTOR
Charles Eisler,
BY
Wm. H. Camfield.
ATTORNEY

July 27, 1948.  C. EISLER  2,446,000
MACHINE FOR FLANGING GLASS BLANKS
Filed Nov. 17, 1943  11 Sheets-Sheet 2
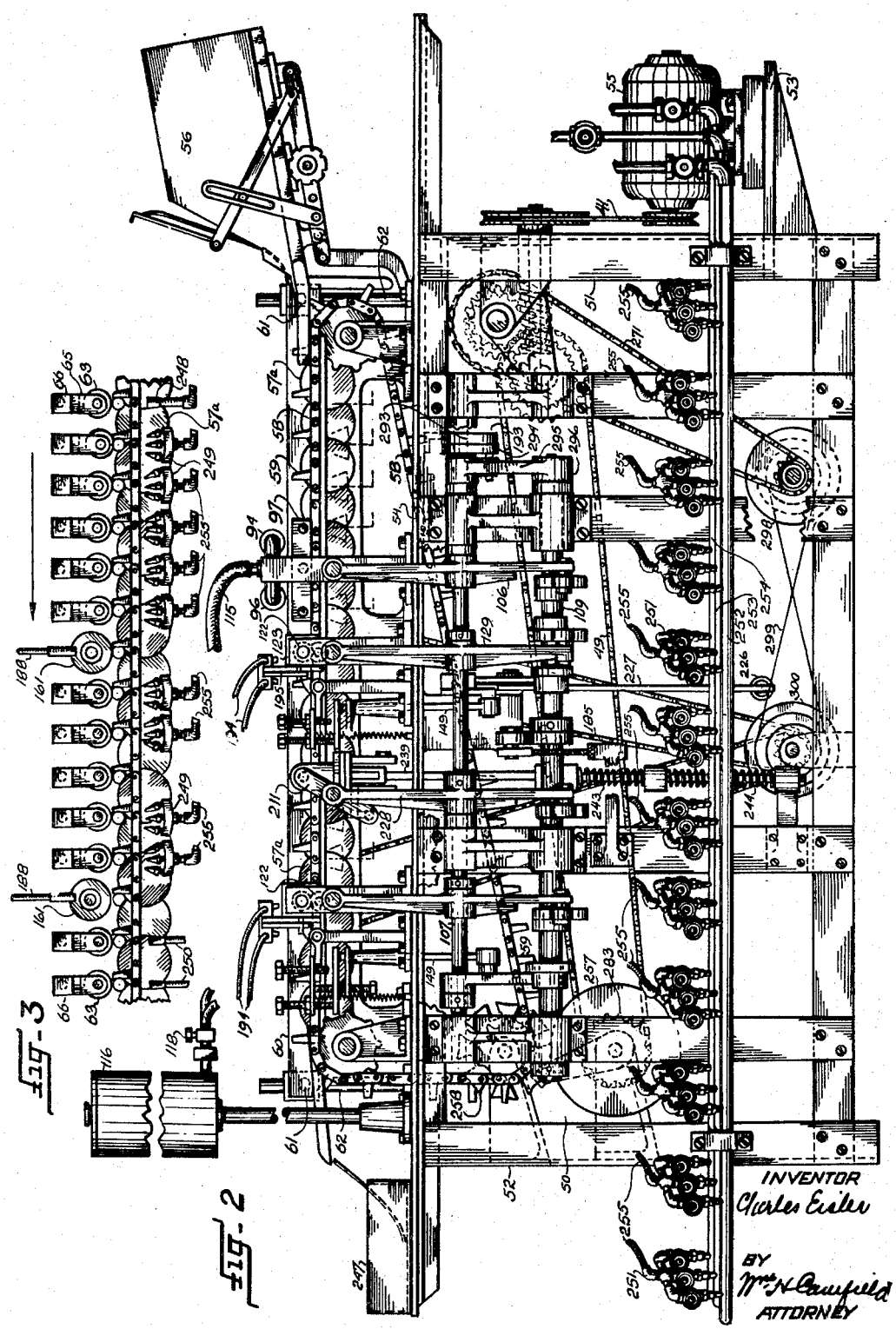
INVENTOR
Charles Eisler
BY
ATTORNEY

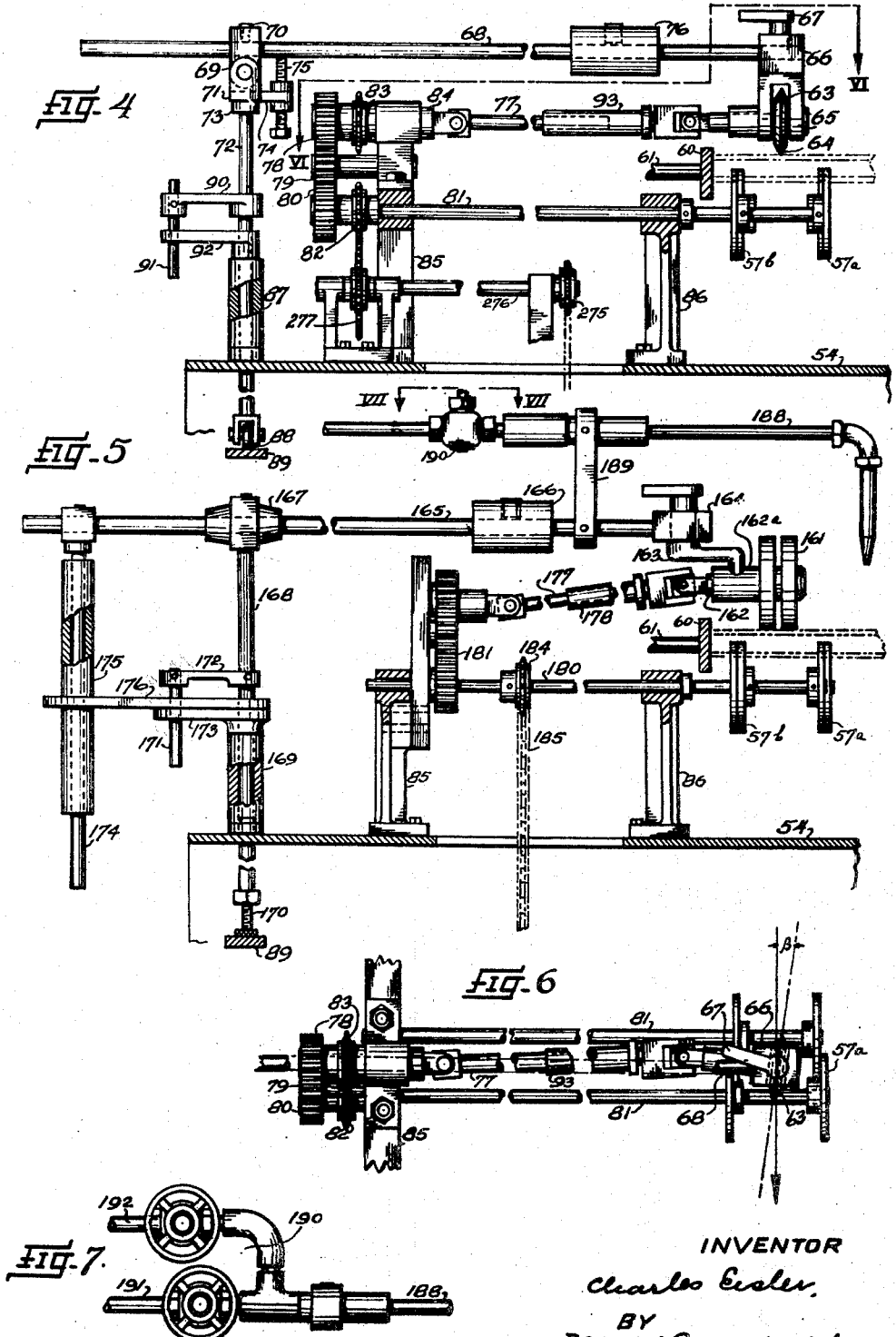

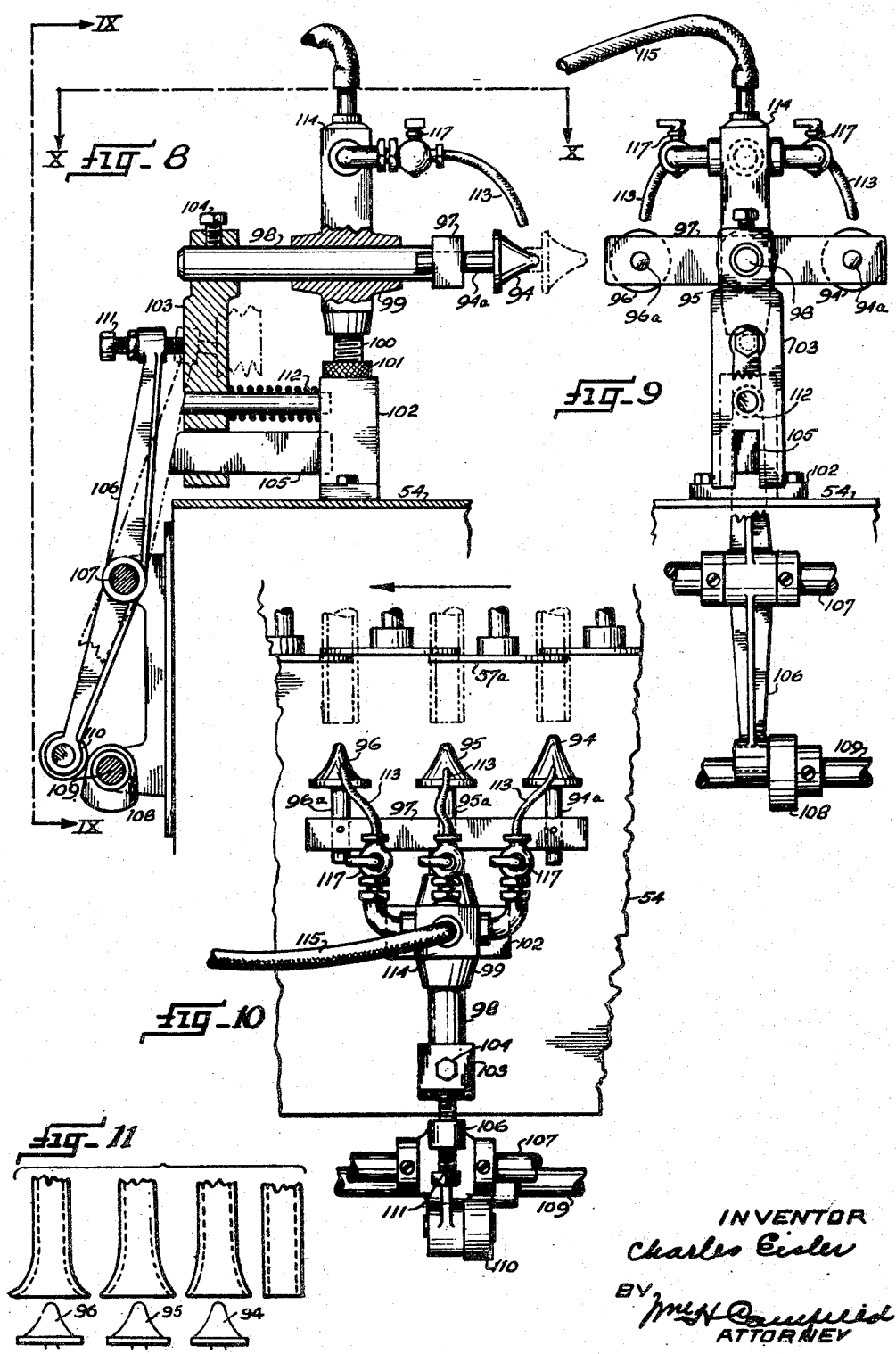

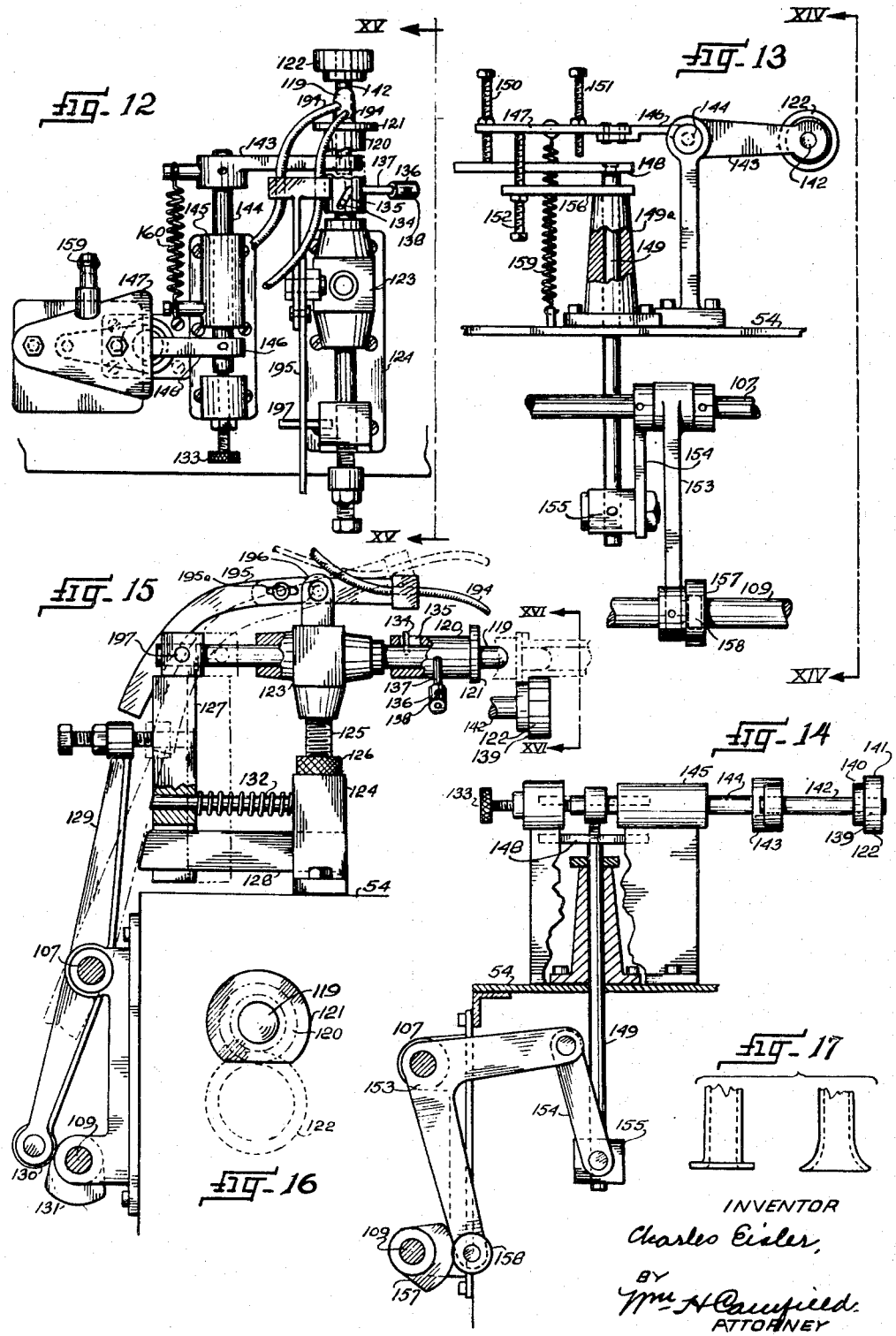

July 27, 1948.  C. EISLER  2,446,000
MACHINE FOR FLANGING GLASS BLANKS
Filed Nov. 17, 1943  11 Sheets-Sheet 6
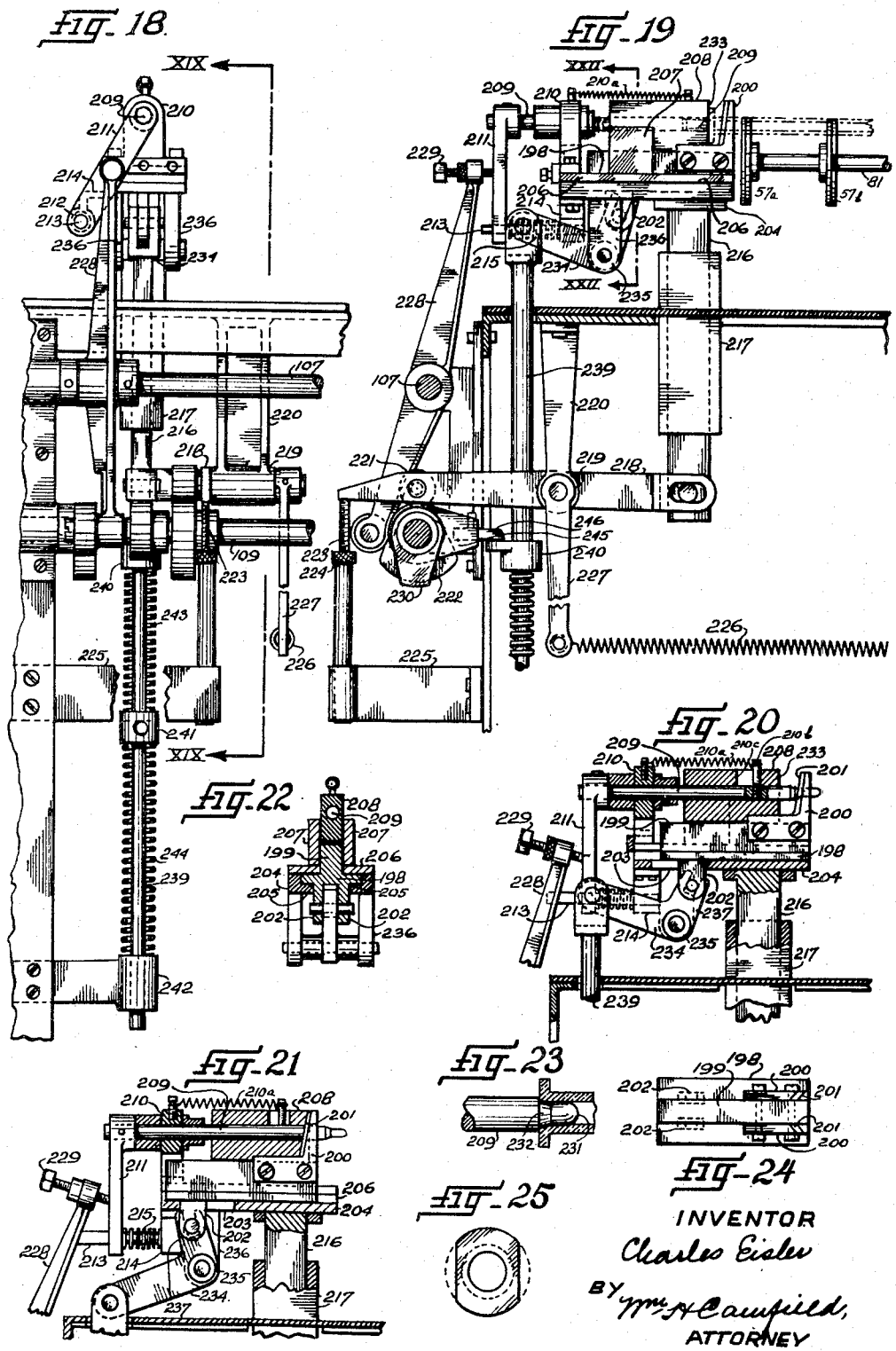

July 27, 1948.  C. EISLER  2,446,000
MACHINE FOR FLANGING GLASS BLANKS
Filed Nov. 17, 1943  11 Sheets-Sheet 7
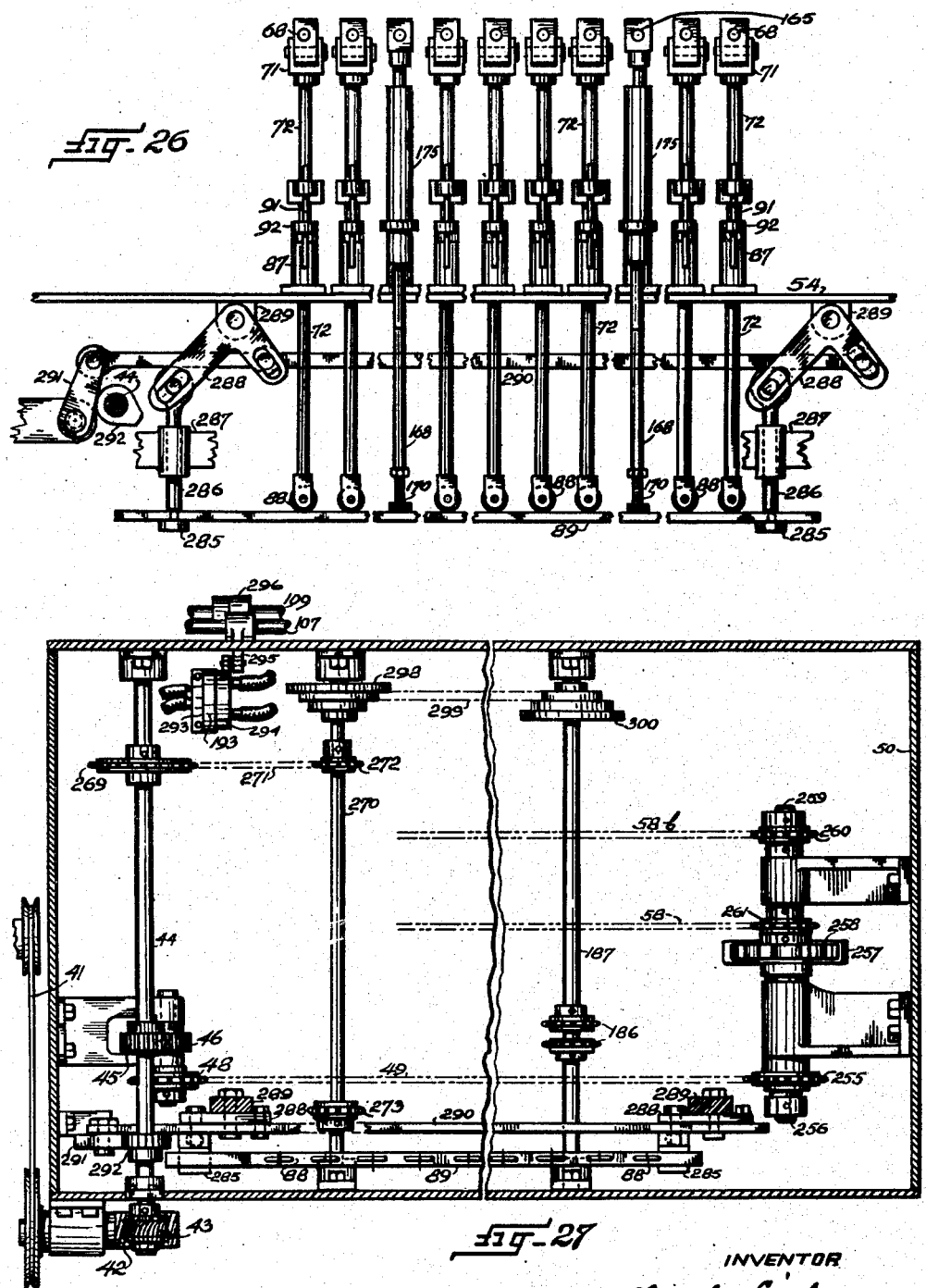
INVENTOR
Charles Eisler
BY
Wm. H. Campfield.
ATTORNEY July 27, 1948. C. EISLER 2,446,000
MACHINE FOR FLANGING GLASS BLANKS
Filed Nov. 17, 1943 11 Sheets-Sheet 8
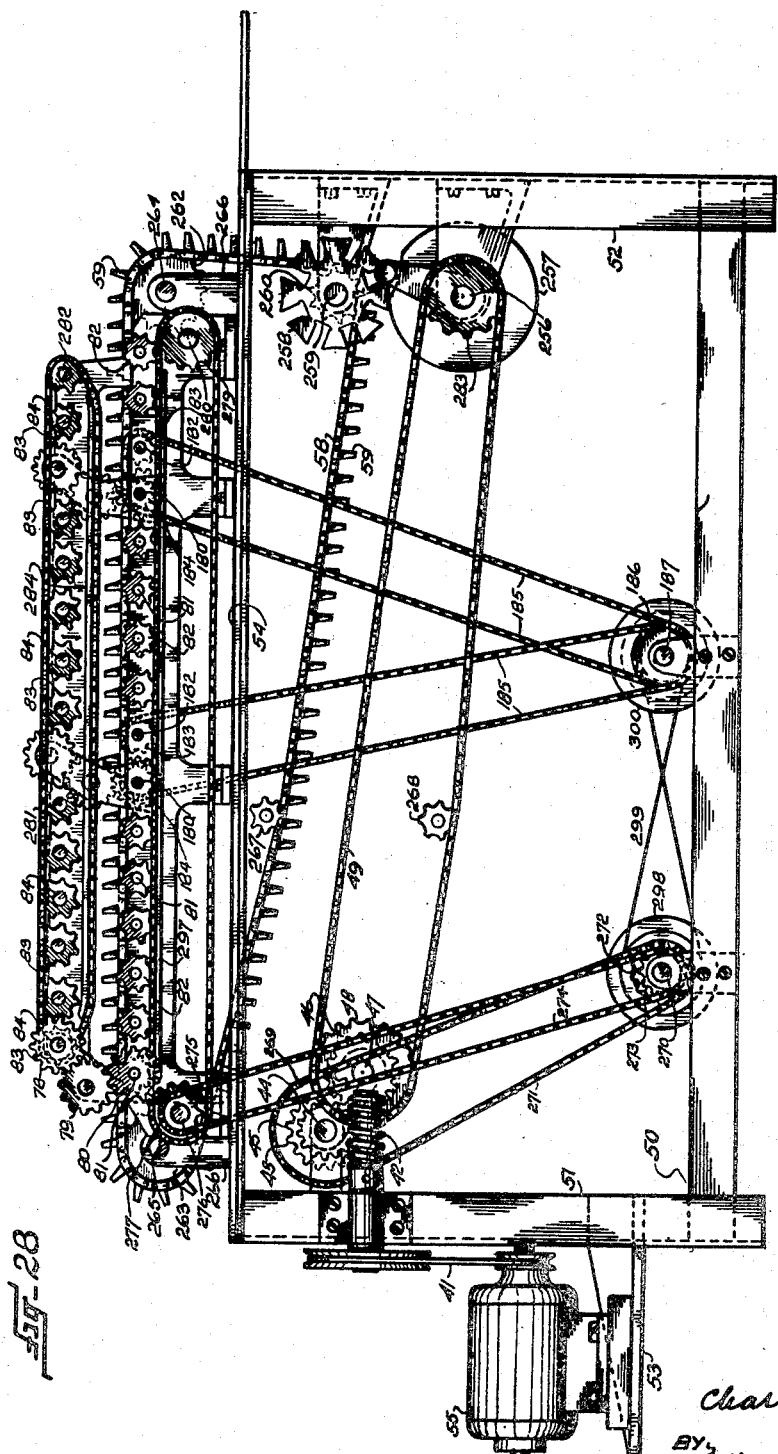
INVENTOR
Charles Eisler
BY
ATTORNEY July 27, 1948.  C. EISLER  2,446,000
MACHINE FOR FLANGING GLASS BLANKS
Filed Nov. 17, 1943  11 Sheets-Sheet 9

INVENTOR
Charles Eisler
BY
Wm N Caufield
ATTORNEY

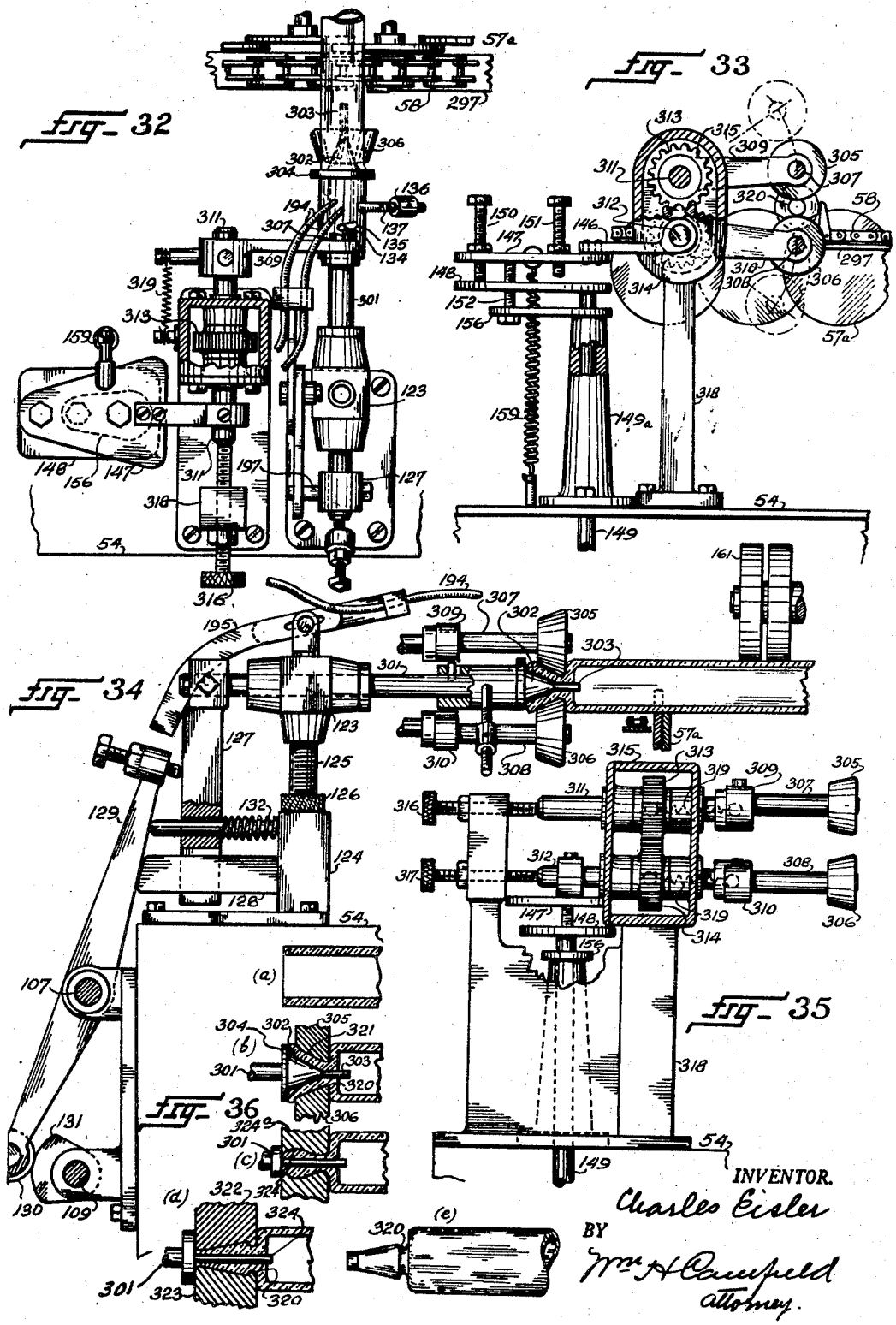

July 27, 1948. C. EISLER 2,446,000
MACHINE FOR FLANGING GLASS BLANKS
Filed Nov. 17, 1943 11 Sheets-Sheet 11
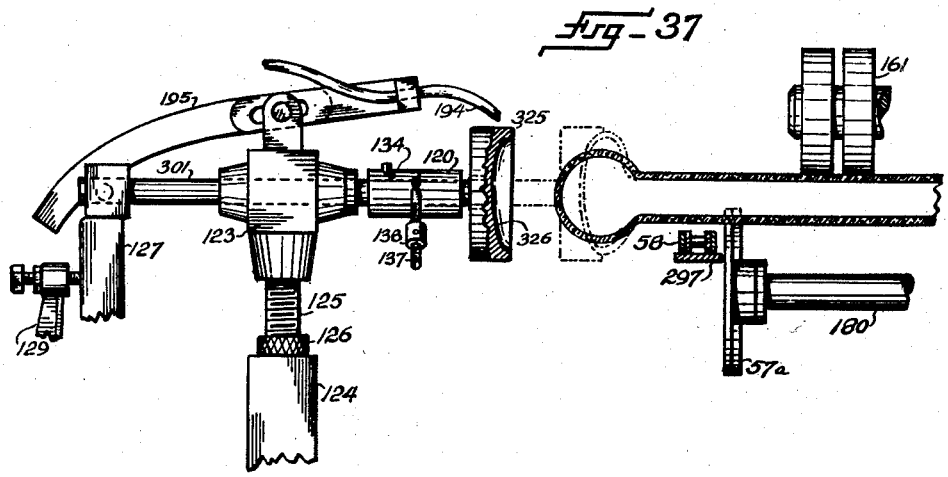
Fig. 37
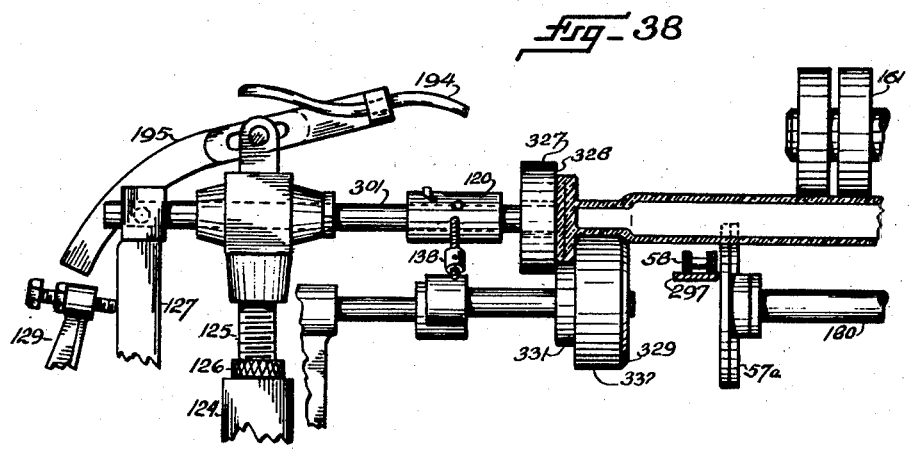
Fig. 38
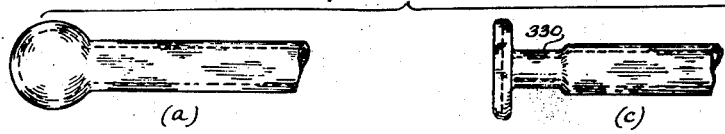
Fig. 39
(a)  (c)
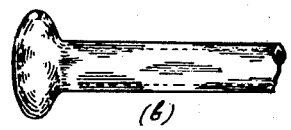
(b)
INVENTOR
Charles Eisler,
BY
Wm H Caufield,
ATTORNEY Patented July 27, 1948

2,446,000

UNITED STATES PATENT OFFICE 2,446,000

MACHINE FOR FLANGING GLASS BLANKS

Charles Eisler, South Orange, N. J.

Application November 17, 1943, Serial No. 510,847

5 Claims. (Cl. 49—7)

This invention relates to a machine for treating tubular glass blanks, the blanks passing through the machine and while heated, being flanged or similarly shaped on one end and being also sheared at the flanged end if desired.

The machine is characterized by a propelling mechanism for the tubular glass blanks that is co-ordinated with heating, flaring, flanging and shearing mechanisms to accurately and quickly produce the article ready for assembly with other elements to form a finished product.

The machine is also designed to accelerate the rotation of the blanks at predetermined locations whereby more satisfactory results are obtained in treating the blanks. Another feature of the machine is the employment of heat-resistant rollers such as asbestos rollers or asbestos-faced rollers to effectively grip and rotate the glass blanks in the presence of increased friction in certain of the operations.

The machine is primarily designed to operate on a glass blank with plunger and mandrel either singly or in combination with one or more rotary forming dies, while the blank is passed step-by-step from one seat of operations to the next. The machine produces finished products, accurately and speedily, for the reason that the machine conveys the blanks and processes the blanks with an absence of vibration, due to the construction and location of the various devices that heat and shape the glass. The forwarding means is smooth and even in its operation and the flaring and flanging means are constructed in a manner to cause an active and positive and accurate, yet speedy manipulation of the glass blank to form a finished article.

The invention also relates to certain details of construction that are more fully described hereinafter and finally embodied in the claims.

The invention is illustrated in the accompanying drawings, in which Figure 1 is a general plan view of the improved type of machine. Figure 2 is a side view of the machine shown in Figure 1. Figure 3 is a view of the heating and conveying mechanism supplemental to Figure 2. Figure 4 illustrates the mechanism for imparting rotation to the glass blanks and effecting the operational alignment. Figure 5 is a view of the mechanism for accelerating the rotation of the glass blanks during certain operations. Figure 6 is a view taken from line VI—VI in Figure 4, illustrating the directional setting of overhead rollers. Figure 7 is a detail in Figure 5, indicated by the line VII—VII. Figure 8 illustrates the mechanism for flaring the ends of the glass blanks prior to flanging them. Figure 9 is a view of the flanging device taken from line IX—IX in Figure 8. Figure 10 is a plan view of the device taken from line X—X in Figure 8. Figure 11 illustrates the successive stages of the flaring operation.

Figure 12 is a plan view of the flanging device. Figure 13 illustrates the flanging die and mechanism for its operation. Figure 14 is a view of the mechanism taken from line XIV—XIV in Figure 13. Figure 15 is a view of a plunger device shown in Figure 12 taken from line XV—XV. Figure 16 is a diagrammatic illustration of the relation of the flanging die and plunger viewed from line XVI—XVI in Figure 15. Figure 17 shows the end of the glass blank before and after flanging. Figure 18 is a general view of a shearing device and its actuating mechanism. Figure 19 is a view of the mechanism shown in Figure 18, taken on line XIX—XIX of Fig. 18. Figures 20 and 21 show the shearing head with the shearing knives at the commencement and termination of the shearing stroke.

Figure 29:
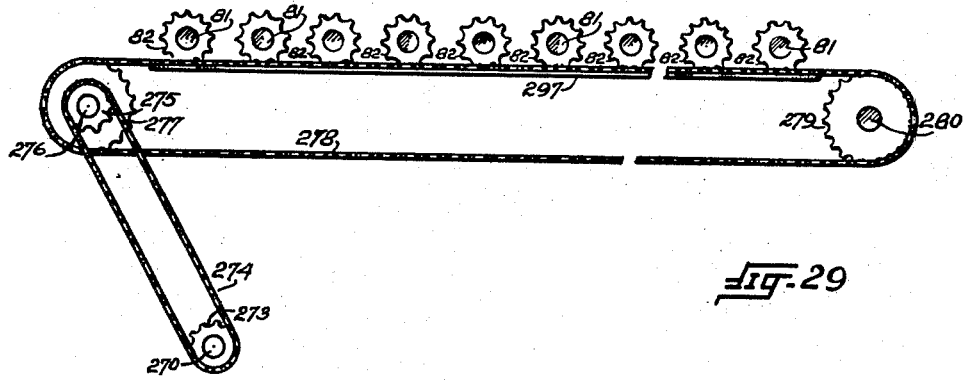
Figure 30:
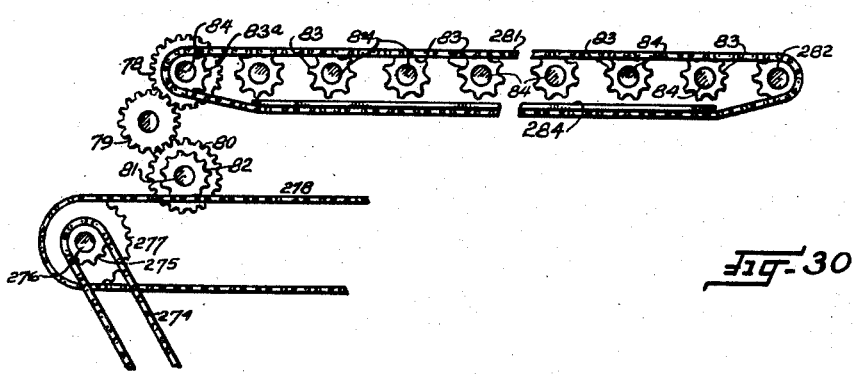
Figure 31:
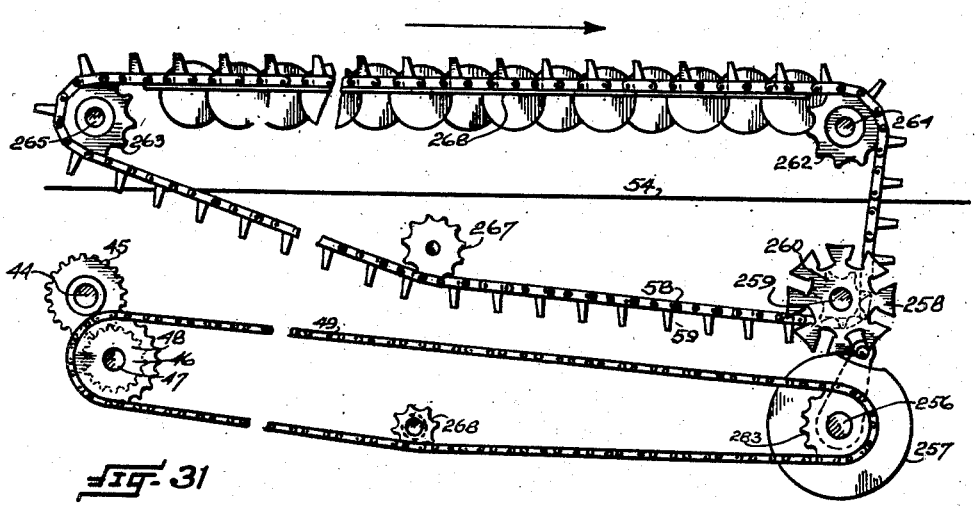

Figure 22 is a section in Figure 19 along line XXII—XXII. Figure 23 illustrates a detail of the plunger. Figure 24 shows the shearing knife carriage. Figure 25 illustrates the effect of the shearing operation on the flanges of the glass blanks. Figure 26 illustrates the device used for raising all overhead rollers. Figure 27 is a plan view of the driving mechanism of the machine. Figure 28 is a diagrammatic illustration of the driving mechanism. Figure 29 is a diagrammatic illustration of the means for jointly raising the disc rollers. Figure 30 is a diagrammatic illustration of the means for rotating the overhead rollers. Figure 31 illustrates the means for periodically conveying the glass blanks from one operation to the next.

Figure 32 is a top view of the mechanism shown in Figures 12 to 15 but adapted for the forming of the tips of syringe barrels and similar articles. Figure 33 is an end view of Figure 32, partly in section. Figure 34 is a side view of Figure 32 equipped for forming the tip of the barrel. Figure 35 is a detail of the rotatable dies and the operating mechanism therefor. Figure 36 illustrates at a, b, c, d, and e, the sequence of operations for forming the tip. Figure 37 illustrates the first operational procedure and the mechanism for forming the heavy flanged end of the grip of a syringe piston or similar article. Figure 38 is a view showing the final stage of the grip forming device. Figure 39 shows the various steps of the method of forming the grip.

The machine is constructed to perform various operations in proper sequence in pre-heating the glass blanks, flaring and flanging the heated blank, shearing the sides of the flange when necessary and then re-forming and smoothing the flanged part of the product.

The machine comprises a main frame designated by the numeral 50 and comprises the uprights 51 and 52, the motor support 53 which carries the motor 55 and the top-plate 54. The top-plate carries the operating mechanisms for the conveying and forwarding means for the glass blanks.

The hopper 56 holds the glass blanks and they are fed from it by vibratory means and deposited on the double train of overlapping revolving discs or rollers 57a and 57b which co-operate with the conveyor chain 58 and its fingers 59 carried at suitable intervals on the links of the chain. The glass blanks, as they leave the hopper are deposited in the recesses formed between the overlapping discs of the first and second set of discs, and are subsequently moved step-by-step from one pair of discs to the next recess by the periodic movement of the chain and its fingers.

The ejection from the hopper 56 to the conveying means is apparent from Figures 1 and 2.

All the disc rollers 57a and 57b are made to rotate in the same direction, the frictional contact of the glass blanks with the rim of the rollers causing the blanks to rotate in the opposite direction at the same peripheral speed as the disc rollers. It is important that the ends of the overhanging glass blanks should be aligned so that they are all properly distant from the mechanisms employed for shaping them. This alignment is effected by urging the blanks against the railing 60 which rail is carried by the brackets 61 which are adjustable as to length and height in the supports 62 by a means, such as by slidably positioning the brackets 61 in members corresponding to support 123 in Fig. 34 receiving support 301, adjustable as to height by screw and nut means corresponding to those indicated at 125, 126 of Fig. 34.

The means for urging the glass blanks against the aligning rail are the overhead rollers 63 which have acutely beveled rims 64 and are journalled in the clevis 65 rotatably adjustable in the supports 66 by the screw levers 67. The rollers can thereby be made to rotate in a plane that is angular relative to the path of travel of the blanks, the angle B in Figure 6 indicating such angular adjustment for the maintenance of alignment.

The roller clevis 65 is carried at the end of the arm 68 which is slidably mounted in the bracket 69 and longitudinally adjustable by the set screws 70. The bracket 69 is vertically rotatable in the support 71 which is mounted on the lifting stanchions 72, the support 71 being rotatably adjusted in a horizontal plane on the stanchions 72 by the nut 73. The support 71 has the horizontal arm 74 in which is threaded the vertical screw 75 in supporting contact with the arm 68 by means of which the bearing contact of the overhead rollers 63 with the glass blanks can be regulated. The arm 68 moreover has the weight 76 slidably mounted thereon, by means of which the pressure of the rollers upon the glass blanks can be resiliently adjusted.

The rollers 63 are rotated by the shafts 77 in slidable splined engagement with the shafts 93 which have universal joints connecting them with the shafts 65 on which the rollers 63 are secured.

Each shaft 93 has a universal joint connecting it with the shaft 84, the shaft 84 having sprocket 83 adapted to be driven by a chain 281 passing above and around the return sprocket 282 (Fig. 30) and, at the other end, around the drive sprocket 83a which, as shown in Figs. 4 and 30, is on the same shaft as that which carries the gear 78 of the gear train 78, 79, and 80, the gear 80 being mounted on a shaft 81 which actuates the disc rollers 57a and 57b. The rotation of all the other overhead rollers 63 is effected by the chain and sprocket drive shown diagrammatically in Figure 30, from which it is apparent that the driving sprocket 82 mounted on shaft 81 drives the sprocket 83 mounted on the shaft 84 through the above-mentioned gear train. The shafts 81 are journalled in the spaced supports 85 and 86, while the shaft 84 is journalled in an extension of support 85.

The overhead rollers are all raised in unison when the glass blanks are transferred from the recess between two disc rollers to the recess next adjacent. This elevating of the overhead rollers is due to the stanchions 72 being slidable in the guide posts 87 and bearing upon the lift rail 89 by the casters 88, the lift rail being raised by means to be hereinafter described. In order to keep the overhead rollers aligned, the lifting stanchions 72 have the fixed arms 90 having depending pilot pins 91 slidable in the arms 92 substantially integral with the guideposts 87.

The mechanism for flaring the ends of the glass blanks is shown in Figures 8 to 10. It will be seen that the flaring cones 94, 95 and 96 integral with the stems 94a, 95a, and 96a respectively are carried by the cross member 97 integral with the bar 98. The bar 98 is slidable in the support 99 which is vertically adjustable in the base 102 by the screw 100 and the nut 101. The depending member 103, secured to the extremity of the bar 98 by such means as a set-screw 104 serves to keep the flaring cones in horizontal alignment with the glass blanks by engaging the guide member 105 which is secured to or integral with the base 102.

The operation of flaring is carried out by periodically inserting and retracting the cones into and from the mouths of the glass blanks by the lever 106 fulcrumed on the shaft 107 and actuated by the cam 108 on the cam shaft 109 which engages the cam follower 110. The lever 106 is provided with the tappet screw 111 which bears against the depending member 103 and thereby advances the flaring cones to the position indicated by dotted lines in Figure 8. They are retracted to their non-operative position by the spring 112 interposed between the member 103 and the base 102, the spring also serving to keep the cam follower in contact with the cam.

The cones 94, 95, and 96 are shaped to produce three successive stages of flaring, as indicated in Figure 11. It is evident that the operation of flaring requires successively increasing curvature of the cones resulting in the accentuated final flare 96. As the cones naturally absorb a considerable amount of heat by their periodic insertions in the hot plastic glass they are cooled by oil dripping from the tubes 113 leading from the manifold 114 to which the oil is fed by gravity by the tube 115 from the oil tank 116. The flow of oil in the tubes 113 is regulated by pet-cocks 117, while at its source the flow is controlled by the pet-cocks 118.

After the flaring the blanks are passed on to the station where they are flanged. The flanging mechanism comprises the plunger 119 on which is slidably mounted the flanging sleeve 120 integral with the flanging plate 121. These parts co-operate with the flanging die 122 in the manner illustrated in Figure 15. The plunger 119 is slidably mounted in the support 123 which is adjustable as to height in the base 124 by such means as the screw 125 and the nut 126. The plunger is introduced into the flared end of the glass blank by virtually the same mechanism as that for flaring. Accordingly it includes the depending member 127, the guide-bar 128 and the lever 129 fulcrumed on shaft 107, the lever 129 having the cam follower 130 kept in contact with the cam 131 by the spring 132 between the depending member 127 and the base 124.

The flanging sleeve 120 with the plate 121 is kept in pressure contact with the flange of the glass blank during the entire duration of the flanging process by the weight 136 adjustable by screw 138 on the lever 137 which extends radially outward from the plunger sleeve. The plunger sleeve 120 has the oblique slot 135 in engagement with the pin 134 secured in the plunger, so that the downward pull of the weight constantly urges the plunger sleeve to rotate and advance. The plunger is axially slidable but not rotatable in support 123, this end being attained by any desired or convenient complementary splining means, such as will be obvious to those skilled in this art.

The flanging die 122 which has the two cylindrical surfaces 140 and 141 stepped at shoulder 139 is rotatably mounted on shaft 142 carried by the arm 143 which is fixed on the shaft 144. The shaft 144 is slidably journalled in the support 145 and carries, beyond the support, the arm 146 to which is secured the plate 147, which is therefore, co-operative with shaft 144. The flanging die is raised to its operative position into contact with the glass blank by partial rotation of the shaft 144 which is effected by lowering the plate 148 mounted on the lifting shaft 149. Lifting shaft 149 is raised and lowered by means of bellcrank 153, fulcrumed on shaft 107, the bellcrank carrying at its lower end the cam roller 158 engaging cam 157. The horizontal arm of the bellcrank is connected by link 154 to the member 155 fixed on vertical shaft 149. The plate 147 has threaded in it the screw bolts 150 and 151 in supported relation to the plate 148, the screw bolt 150 being located as far from the shaft 144 the length of the plate allows. The screw 152 threaded in the bracket 156 integral with the guide base 149a abuts on the plate 147 and thereby limits the elevation of the flanging die 122. The tension spring 159 having attachment to the plate 147 and the top plate 54 of the main frame maintains the screw 150 in constant contact with the plate 148 and thereby insures the upward travel of the flanging die 122. If greater speed of arcuate travel of the die is desired the screw 151 can be used instead of the screw 150 since the two speeds of travel of the die for the same lifts of the plate 148 are inversely proportional to the distance of the respective screws to the fulcrum 144. The flanging die 122 is held in resilient relation with the inner surface of the glass flange by the spring 160 attached to the arm 143 and to the support 145. The spacing between the die and the flanging plate 121 can be adjusted to the required thickness of the glass flange by the screw 133 abutting the extremity of the shaft 144 against the tension of spring 160.

The flanging plate 121 of the plunger sleeve 120 is preferably larger in diameter than the resulting flange of the glass blank and therefore requires the conformation shown in Figure 16 in which the die is shown by the two dotted circles below the flanging plate and the plunger which is shown in full lines. The glass blank and flange are indicated by dash-dot circles concentric with the plunger. It is seen that the flanging plate is cut off horizontally at the bottom to allow the smaller cylinder 140 of the die to pass underneath for the purpose illustrated in Figure 15.

It has been found expedient to rotate the glass blanks rapidly during the operations of flanging and re-forming by increasing the rotational speed of the over-head rollers and the disc rollers. In the operation of flanging, the rotation of the glass blanks and their alignment is accomplished by the power-driven asbestos rollers 161 mounted on the shaft 162 which is journalled in the bearing 162a. The bearing 162a has the arm 163 adapted for turning in the support 164 fixed at the end of the arm 165. As in the case of the smaller overhead roller 63, a double roller is set at an angle to the direction of travel of the glass blanks. By reason of the considerable width of the double rollers their angular setting is considerably less than that of the smaller rollers. The arm 165 carries a slidable weight 166 for regulating the pressure of the rollers upon the glass blanks. The arm 165 is adjustable as to reach in the support 167 which is carried by the stanchion 168 slidable in guide-base 169 and having supports on the lift rail 89. The height of the asbestos rollers with reference to the disc rollers can be adjusted by means of the screw 170 at the bottom of the rod 168. The arm 165 is secured against horizontal deviation by the pilot pin 171 depending from the arm 172 which is fixed on the sliding stanchion 168. The pilot pins 171 have passage in the bracket 173 integral with the guide-base 169. The arm 165 which carries considerably more weight than the arm 68 must also be secured against bending vertically, and for this reason, it is extended beyond the support 167 on the stanchion. At its extremity it carries the depending guide rod 174 which is received in the long sleeve 175 substantially integral with the bracket 176 fixed on the stanchion 168.

It is obvious that the operation of flanging entails considerable friction created between the flanging plate, the plunger and die and the glass flange in its semi-plastic condition. This friction will tend to retard the rotation of the glass blanks and would thus defeat the purpose of the increased speed of rotation of the disc rollers. The proper rotational speed of the glass blanks, however, is preserved by the use of the asbestos rollers, preferably double rollers, their somewhat yielding material gripping the glass blank more effectively than would a hard surface roller, such as a metal roller. The grip moreover, is a separate one for each roller to either side of the median line of the blank, provided that the axial center of both rollers is positioned exactly vertically above the median line of the blank. The asbestos rollers are driven by the universal-jointed shaft 177 in splined relation with the sliding sleeve shaft 178, rotation to these shafts being imparted by the shaft 180 in driven relation to the train of gears 181. The two adjacent pairs of disc rollers which require to be driven at increased speed are mounted on the corresponding shafts 180 and 182. Referring to Figures 1, 27 and 28 it is seen that the sprockets 184 and 183 respectively are mounted on the shafts 180 and 182 which sprockets are driven in unison by the chain 185 from the sprocket 186 of shaft 187. The shaft 187 is driven from the main drive shaft 270 in the base frame of the machine in the manner which is hereinafter described and shown in Fig. 28.

The end of the glass blank which is to be flanged and reformed are maintained in a plastic condition by heating during the operations. Since the position of the flanging die does not permit the flame to be applied from below, the method of heating from above has been resorted to by providing a single jet flame from the tube 188 supported in the bracket 189 which is carried by the arm 165. The tube 188 feeds a mixture of gas and air to the flame jet by way of the mixer 190 into which the gas and air are introduced by the tubes 191 and 192 from the supply manifolds.

The mechanically operated economizer 193, Figs. 1 and 27, is interposed between the manifold and mixer 190 for the purpose of reducing the flame during the intervals when the flanging device is inoperative, as during the forwarding of the glass blanks. The economizer, which is of standard type and includes the stationary disc 293b and the revolvable disc 294 whereby the gas flow is reduced to a minimum, is operated by the bell-crank 295 fulcrumed on shaft 107 and actuated by the cam 296 on the cam-shaft 109. The economizer may be of any desired or convenient type and construction; for example, it may be essentially like that shown in Figs. 9 and 10 of patent to Thomas, 1,669,635 issued May 25, 1928.

Cooling of the plunger and flanging die is effected by oil drip from the leads 194 carried in bracket 195. The bracket 195 which is made in two sections, Figs. 12 and 15, is adjustable as to length by the slot and screw 195a and is pivotally mounted in the support 196. As the center of the weight of the bracket is back of its support, the bracket rests at all times on the limit pin 197. During the flanging operations when the lever 129 is advanced to the positions shown in dotted lines in Figure 15, the bracket is correspondingly rotated, the leads 194 being tipped thereby at an angle which automatically stops the oil drip.

After the glass blank has been flanged it is passed by the conveyor chain to the shearing device by which the flange is shaped as shown in Figure 25. Referring to Figure 19 it is seen that the shearing mechanism comprises the carriage 198 provided with the central rib 199 at either side of which are mounted the chopping knives 200 provided with the sloping cutting edges 201. Integral with the carriage 198 and depending from its bottom are the lugs 202 which pass through the slot 203 of the support plate 204, between the ledges 205, of which, and the cover plate 206 the carriage 198 is slidably mounted. Integral with the cover-plate are the spaced lugs 207 which are welded or otherwise secured to the support 208 which has passage for the plunger 209. The plunger which has additional support in the bearing 210 secured to the cover-plate 206, has the depending member 211 fixed to its rear end. The member 211 is provided with the perforation 212 which receives the pilot pin 213 fixed in the depending lug 214, the compression spring 215 being interposed between the member 211 and the lug 214.

The support plate 204 is carried by the upright support 216 slidable in the guide member 217, the entire shearing mechanism being raised or lowered by the lever 218 fulcrumed in the bearing 219 integral with the bracket 220 secured to the base frame of the machine. The lever 218 having the cam follower 221 is actuated by the cam 222 on the cam shaft 109. The movement of the lever 218 and consequently the upward travel of the shearing head is limited by the screw 223 and lock-nut 224 carried by the bracket 225. The tension spring 226 which is attached to arm 227 of the bearing 219 and any convenient part of the machine insures the constant engagement of the lever 218 with the cam 222 and also returns the shearer head to its operative position. Levers 218 and 227 are pinned to the shaft in bearing 219.

The plunger 209 is inserted into the glass blank by the lever 228 fulcrumed on shaft 107, the adjustable tappet screw 229 carried by lever 228, bearing against the member 211, which, as already mentioned, is secured to the plunger. The lever 228 is actuated by the cam 230 whereby the plunger is moved forward and inserted into the mouth of the glass blank, the plunger being subsequently retracted therefrom by the action of the compression spring 215 and of the tension spring 210a attached to the bearing 210 and to the plunger. In Fig. 20, 210c is the slot in which pin 210b slides, the pin 210b being fixed in the plunger 209 which is retractable by the spring 210a fastened to member 210. The plunger has the mandrel head 231, which, as shown in Figure 23, is smaller in diameter than the body of the plunger and is connected therewith by the bevelled section 232 which serves to give the mouth of the glass blank the funnel-like end as illustrated in Figure 23.

The shearing of the glass flange is performed by the shearing knives 200, which in their non-operative position shown in Figure 19, are distant from the face of the plunger support 208, the face being designated by the numeral 233. This condition occurs when the shearing-head is in its lowest position at the moment the glass blank is positioned for shearing. When the shearing-head is subsequently raised, the flange of the glass blank contacts the face 233 and is behind and clear of the shearing knives. The shearing knives 200, which are spaced in shearing relation to the support are then retracted by the bell-crank 234 fulcrumed in the bearing 235 of the lugs 236 which are integral with the bottom plate 204. The bell-crank arm 237 engages the bearing pin in the lugs 202 of the knife carriage and thus alternately retracts and advances the knives which each cut a segment from the glass flange. Figure 25 shows the appearance of the flange after shearing.

The other end of the bell-crank 234 has connection with the push rod 239 on which is slidably mounted the collar 240. The fixed collar 241 is mounted intermediate the slidable collar 240 and the bottom guide 242. The heavy compression spring 243 is interposed between the slidable collar 240 and the fixed collar 241, while the comparatively light compression spring 244 is interposed between the collar 241 and the guide 242. The push rod 239 is actuated by the cam 245 provided with the cam finger 246 which engages the slidable collar 240. During the power stroke the downward pressure of the cam finger 246 is transmitted to the fixed collar 241 by the heavy spring 243 which is substantially non-compressible under the normal working pressure required for shearing glass flanges of normal plasticity. The push rod 239 is therefore lowered by the pressure of the collar 241 working against spring 244 which yields to the normal working pressure and subsequently raises the push rod back to its normal position.

Should the glass flange, for some reason such as exceptionally low degree of plasticity, offer too much resistance to the passage of the shearing knives, these knives, and consequently all other parts of the shearing mechanism would suddenly be arrested, and it is obvious, since the cams would keep on working, one or more of the parts of the mechanism would suffer fractures or other damage if it were not for the heavy spring 243 which, in this emergency, would yield to the abnormal pressure and allow the cam finger 246 to depress the sliding collar 240 and be subsequently disengaged therefrom.

The sequence of operations of the shearing device is as follows: The shearing head including the mandrel and knives is raised vertically in working alignment with the glass blank by cam 222 and spring 226; then plunger and mandrel are advanced and inserted into the flanged glass blank by cam 230; then the knives are moved toward the shearing head by cam 245 and shear flanges off the glass blank; then the knives are retracted by spring 244; then the plunger and mandrel are retracted by springs 215 and 210a; then the shearing head is lowered by the rise of the cam 222, the sheared glass blank is forwarded by the conveying mechanism and a new blank is positioned by the conveyor chain, and the above operations are repeated.

The glass flanges, after the shearing, have relatively sharp edges and the adjacent portion of the glass tube shows a slight oval distortion caused by the pulling action of the knives and the upwardly acting pressure component of the oblique knife edges. The glass blank is passed through a re-forming process effected by mechanism which is in all respects identical with that used for flanging including the use of double high speed asbestos rollers, accelerated disc rollers and the single jet overhead burner. The mechanism therefore needs no description.

After-preforming, the blanks are subjected to a smoothing process effected by successively directing two single jet burners 250 diagonally arranged to the direction of travel of the blanks so that the flanges as well as the adjacent portions of the blank are uniformly heated. After the smoothing step, the flanged and sheared glass tubes are forwarded to the receiving line 247 (Fig. 1).

It should be noted that the pre-heating of the glass blanks is effected by the single jet burner 248 of comparatively low heat, subsequent heatting to the required degree of plasticity being achieved by the series of manifold burners 249, disposed as shown in Figure 3, and the overhead single jet burners used in the operations of forming and reforming. 250 are two fishtail burners for annealing glass after the forming operations. Diffused heat is applied after the forming operations to eliminate internal stresses.

Gas, air and oxygen are piped to the burners from the valved manifolds 251 which communicate with the gas supply tubes 252, 253 and 254.

The tubes or pipes 255 connect the manifolds with the burners. As mentioned before, the economizer 193 is interposed between the gas feed system from the manifolds to the overhead burners, one economizer sufficing for both burners. In the drawings only one overhead burner is shown fully piped and connected to the economizer as illustrative of the entire installation.

The driving mechanism comprises the motor 55 which, by sheave transmission 41 actuates the worm 42 and thereby the worm gear 43 keyed on the main shaft 44. Shaft 44 by gear 45 in mesh with gear 46 drives shaft 47 on which is mounted sprocket 48 which by chain 49 drives sprocket 283 on shaft 25. On shaft 256 is mounted the Geneva drive wheel 258, which is engaged by the Geneva follower pin 258 on shaft 256. On shaft 259 are mounted the driving sprockets 260 and 261 which drive the conveyor chains 58a and 58b respectively, these chains being provided with the fingers 59 by which the glass blanks are periodically transferred, step-by-step, from one pair of disc rollers to the next one, as hereinbefore described. The conveyor chains 58 and 58b are in mesh with the sprockets 262 and 263 which are keyed on the shafts 264 and 265 respectively, these shafts being journalled in the supports 266. Idler sprockets 267 and 268 may be provided where required. The conveyor chain drive, above described, is shown separately in Figure 31.

The disc rollers which impart rotary motion to the glass blanks and also serve to align them, are driven as follows: The sprocket 269 on the main drive shaft 44 drives, by the chain 271, the shaft 270 on which is mounted the sprocket 272. On shaft 270 is also mounted sprocket 273 which, by chain 274, drives sprocket 275 keyed on shaft 276 (see Figure 28). On shaft 276 is also keyed sprocket 277 (see Fig. 29) meshing with chain 278 which returns on sprocket 279 on shaft 280. The upper length of chain 278 intermediate the sprockets is supported on rail 297 and engages each one of the sprockets 82 which are keyed on shafts 81. The shafts 81 carry the disc rollers 57a and 57b (Fig. 1) which impart rotation to the glass blanks. The drive above described is shown in Figure 29.

From Figure 30, which shows the drive for the overhead rollers 63 it is seen that the sprocket 82 (which, although shown as such need not necessarily be the terminal sprocket of the chain drive shown in Figure 29) is keyed on the shaft 81. On shaft 81 is also keyed the gear 80 (Fig. 4) which, by the intermediate gear 79 drives gear 78 on shaft 84, on which shaft is the sprocket 83 of the chain drive which has the chain 281 and the return sprocket 282, identical with the intermediate sprocket 83. The lower reach of the chain 281 is kept free of the sprocket 83 by the interposed guide rail 284; the upper reach of chain 281 engages all the sprockets 83 mounted on shafts 84, which through the universal shaft extensions 77 and 93 actuate all overhead rollers 63.

The means employed for driving the disc rollers at increased speed in the operations of flanging and re-forming by chain transmission from shaft 187 have already been described. It should be noted however that a variable speed drive is employed from shaft 270 to shaft 187 which comprises the multiple step pulley 298 on shaft 270 having belt transmission 299 to the complementary step pulley 300 on shaft 187. By this means three or four different speeds for the disc rollers and overhead asbestos rollers can thereby be obtained, the selection of speed being governed by the inter-related conditions of friction, plasticity, adhesives and relative rotational speed of the glass blanks.

All overhead rollers 63 and 161 are jointly raised, prior to the shifting of the glass blanks from one recess between disc rollers to the next recess, by the lifting bar 89. They are subsequently allowed to rest on the glass blanks again by their own weight, their elevation and descent being concurrent with the periodic starting and stopping of the conveyor chain, as effected by the Geneva drive. The lifting bar 89 is carried on the supporting lugs 285 of the lifting rods 286 which are slidable vertically in the guides 287 attached to the main frame. The rods 286 are raised and lowered by such means as the bellcrank 288 fulcrumed in the bearings 289 and actuated in unison by the connecting rod 290 which is reciprocated by the lever 291 actuated by cam 292 on the main shaft 44.

The machine hereinbefore described and also illustrated in Figures 1 to 31 performs various operations by devices adapted for the particular products. It is obvious that these devices can be adapted to the performance of slightly different operations by the substitution of different tools without alteration of the working parts of the machine.

For instance, the making of glass syringes requires the flanging, shearing, and re-forming operations identical with those already described. In order to make the tip of the syringe barrel, the glass tube must pass through the steps designated by letters $a$ to $d$ in Figure 36. It is apparent from the drawing that these various steps can be carried out by the same mechanical devices as before, with only slight modifications. In the drawings, Figures 32 to 38, the parts of the devices which remain unaltered are designated by the same reference numerals as before.

In referring to Figures 32 to 36 it will be seen that the device illustrated pertains to the forming of the tips of syringe barrels and that operations required are fundamentally the same as those performed by the devices shown in Figures 12 to 15.

The first operation, shown in Figure 36b consists in forming the end of the barrel tube into a flared neck 321 which is narrow at the base, by the roller dies 305 and 306 which rotate in unison in opposite directions above and below the neck. The simple device shown in Figures 13 and 14 is therefore modified into the double-acting device best illustrated in Figure 33. The upper roller 305 is rotatably mounted on shaft 307 carried by the arm 309 which is secured on the shaft 311.

The lower roller 306 is rotatably mounted on the shaft 308 carried by the arm 310 on the shaft 312. On the shaft 311 is the spur gear 313 in mesh with the spur gear 314 on shaft 312, to which oscillating motion is imparted by the arm 146 which carries the plate 147 of an oscillating device identical with that shown in Figure 13 and actuated by similar mechanism, the rollers 305 and 307 being thereby periodically moved from the operative positions shown in Figure 33 to the arcuately spaced non-operative positions shown in dotted lines. The gears 313 and 314 are enclosed in the housing 315 on the support 318, the roller dies 305 and 306 being adjustable axially with reference to the glass tube by the screws 316 and 317 and the retracting springs 319 equivalent to the single spring 160 shown in Figure 12.

In order to provide the flared tip with the required orifice the device has the cone-shaped mandrel 302 on the plunger shaft 301 the cone having the flange 304 and prolonged into the straight mandrel 303 of a diameter corresponding to that of the required duct, the composite mandrel co-operating with the die rollers as shown in Figures 34 and 35b, the method of advancings and retracting the mandrels being the same as that shown in Figure 15.

After the first tip-forming operation, which results in the tip-shaped end shown in Figure 36b the glass tube, which has cooled during that operation is heated again and brought to a degree of plasticity which causes the flared neck to close and assume the bulbous shape shown in Figure 36c, the straight mandrel 324 being inserted by mechanism the same as that shown at 303 in Figure 34, to form the duct of the syringe tip. After the first tip-forming operation (preforming) which results in the tip shape shown in Fig. 36b, the glass tube passes to the next preforming operation performed by the rollers 324a and 324b and the straight mandrel 324 which gives the tip a bulbous shape. The final forming operation which results in the tip shape shown in Figure 36d is performed in the manner and by the same means as in the first operation, the only difference being the shape of the rollers 322 and 323 and of the mandrel 324, the final product then is a syringe having a tapered tip with the restricted portion or neck 320 at the base, the tip being provided with a straight duct communicating with the interior of the syringe barrel. There remains the straight portion at the extremity of the tip which is cut off by a rotating disc-cutter, but the operation can only be performed when the tip has been thoroughly cooled and is perhaps best done by hand.

Another substitution of tools is shown in Figures 37 and 38 for the purpose of forming the grip of the syringe piston which is produced by the progressive steps shown in Figures 39a and 39b and 39c. Referring to the drawings it is apparent that the mechanical devices employed are identical with those shown in Figure 15 with the exception of forming dies. The making of the syringe pistons however should be done on a separate machine, which may include means for blowing. As depicted in Fig. 37 the tube is represented as blown before it is fed onto the conveyor discs 57a. The piston tube, which has been blown to the globular bulb shape shown in Fig. 39 prior to being put on the machine is kept rotating by the asbestos rollers 161. The globular bulb is then compressed to the partially flattened shape shown in dotted lines by the forming die 325 mounted on the plunger shaft 301 which is advanced and retracted by the mechanical means shown in Figure 15. The forming die, which is of circular shape has the concave matrix 326 by which the preliminary shape of the bulb is effected. The glass piston is then heated again and is passed on to the final forming operation illustrated in Figure 39c which is again effected by the same mechanism as before, the operation being almost the same as the flanging operation shown in Figure 15.

Referring to Figure 38 it will be seen that the block 327 which is preferably made of carbon or other heat-resisting material and which has the flat compression surface 328, is mounted on the plunger shaft 301 and works in co-operation with the forming die 332 provided with the shoulder 331 and the bevelled edge 329. The glass piston, as before, is rotated by the asbestos overhead rollers 161. By advancing the carbon die 327 against the partially flattened piston bulb and raising the forming die to the position shown the final shape shown in Figure 39c is produced.

The piston is now provided with a flat rim evolved by pressing the front and rear sides of the previously flattened bulb together, and a neck portion 330 of reduced diameter which enables the manipulator of the syringe to get a better hold on the piston.

From the above description it is obvious that the mechanism described can be used for any forming operation requiring a plunger and mandrel either singly or in combination with one or more rotary forming dies.

I claim:

1. In a machine for treating glass blanks, means for passing the blanks through the machine, means to heat and soften the blanks during their passage through the machine, means to interrupt the passage of the blanks and to flange them when so interrupted, a mechanism for shearing flanged portions of said blanks, comprising a support plate, a carriage slidably arranged on said plate, said carriage having a face, a plunger slidably arranged in said carriage, means to urge said plunger into a glass blank having a flange to be sheared and to urge said flange against said face, shearing members fixed to said carriage, and means to reciprocate said carriage on its support to move the shearing members into shearing engagement with the flange to shear the latter.

2. In a machine for treating glass blanks, means for passing the blanks through the machine, means to heat and soften the blanks during their passage through the machine, means to interrupt the passage of the blanks and to flange them when so interrupted, a mechanism for shearing flanged portions of said blanks, comprising a support plate, a carriage slidably arranged on said plate, said carriage having a face, means to urge the flange of a glass blank to be sheared against said face, shearing members fixed to said carriage, and means to reciprocate said carriage on its support to move the shearing members into shearing engagement with the flange.

3. In a machine for treating glass blanks, means for passing the blanks through the machine, means to heat and soften the blanks during their passage through the machine, means to interrupt the passage of the blanks and to flange them when so interrupted, a mechanism for shearing flanged portions of said blanks, comprising a support, shearing members, means to position the flanged portion of a glass blank to be sheared against said support, and means to actuate said shearing members into shearing engagement with said flanged portion of the blank.

4. In a machine for treating glass blanks, means for passing the blanks through the machine, means to heat and soften the blanks during their passage through the machine, means to interrupt the passage of the blanks and to flange them when so interrupted, a support plate, a carriage slidably positioned on said plate, knives fixed to said carriage, a plunger, a beveled head on said plunger, means to position the end of a flanged glass blank on the beveled head of said plunger, and means to reciprocate the carriage relative to the flange of said blank to move the knives against said flange to sever portions of said flange therefrom.

5. In a machine for treating glass blanks, means for passing the blanks through the machine, means to heat and soften the blanks during their passage through the machine, means to interrupt the passage of the blanks and to flange them when so interrupted, a support plate, a carriage slidably positioned on said plate, knives fixed to said carriage, said knives having sloping cut edges, a plunger, means to position the end of a flanged glass blank on said plunger and means to reciprocate the carriage relative to the flange of said blank to move the knives against said flange to sever portions of said flange therefrom.

CHARLES EISLER.

REFERENCES CITED

The following references are of record in the file of this patent:

UNITED STATES PATENTS

| Number | Name | Date |
|---|---|---|
| 1,530,884 | Conde | Mar. 24, 1925 |
| 1,906,617 | Key | May 2, 1933 |
| 2,234,302 | Dichter | Mar. 11, 1941 |
| 2,266,417 | Eisler | Dec. 16, 1941 |
| 2,367,495 | Gray | Jan. 16, 1945 |